United States Patent Office 3,687,719
Patented Aug. 29, 1972

3,687,719
METHOD OF IMPROVING ADHESION OF VULCANIZED ACTIVE REENFORCING FILLER CONTAINING RUBBER COMPOSITIONS TO METALS
Erhard Klotzer, Hanau am Main, and Johannes Pochert, Wesseling Bezirk Cologne, Germany, assignors to Deutsche Gold- und Silber-Scheideanstalt, Frankfurt am Main, Germany
No Drawing. Filed July 5, 1967, Ser. No. 651,154
Claims priority, application Germany, July 6, 1966, D 50,490
Int. Cl. B32b 15/08; C08c 19/10
U.S. Cl. 117—132 BF          4 Claims

ABSTRACT OF THE DISCLOSURE

Method of improving the adhesion of vulcanized rubber compositions to metals comprising admixing (1) active reenforcing extremely finely divided silicas and/or aluminum silicate and/or calcium silicate or calcium carbonate, if desired, blended with carbon black, and (2) components capable of resin formation with the rubber composition before it is vulcanized on the metal. The quantity of the silicas or silicates or calcium carbonate alone or blended with carbon black admixed with the rubber composition is 5 to 100, preferably, 10 to 50 parts by weight per 100 parts by weight of rubber. A further improvement in the bond obtained can be achieved by admixture of heavy metal oxides with the rubber components prior to the vulcanization.

BACKGROUND OF THE INVENTION

The invention concerns a process for improving the adhesion of vulcanized active reenforcing filler containing material and synthetic rubber compositions on metals such as brass, steel, zinc and the like which renders it possible to provide especially high adhesion under special mechanical stresses.

Bonded rubber-metal articles, such as, shock absorbers, vibration damping connectors, or rubber articles armored with steel cables such as vehicle tires, conveyor belts and the like are subject to considerable dynamic stresses and as a consequence it is important that the rubber adheres as firmly as possible to the metal.

A known process for bonding vulcanizable rubber mixtures to metals, preferably, brass, resides in that a rubber mixture of usual composition provided with vulcanizing agents is produced on a rolling mill or an internal mixer and high proportions of active carbon and sulfur are mixed into such mixtures. The rubber mixture is applied to the metal and vulcanized thereon under pressure. The sulfur which is not consumed in the vulcanization reaction affects the bond of the rubber to the metal with formation of sulfur bridges.

Investigations have also been made to ascertain the suitability of active reenforcing silicas for mixtures for effecting rubber-metal bonding, which lead to the conclusion that additions of silica cause an increase in the adhesion which increases with increase in the surface area of the silicas employed.

The rubber to metal bond previously attained, in general, sufficed for such purposes in which the bonded article is subjected to compression and tensile stresses and also to a certain degree to sheer stresses. However, the bond is not sufficient when bending stresses with elastic rebound occur as in such instances the sulfur bridges with the metal formed during the vulcanization, which at the metal side exhibit a crystalline metal sulfide character, tear off. While the addition of finely divided silica does cause a certain increase in the adhesion, it is not sufficient when high stresses are encountered over longer periods of time.

The bonds attained by the previously known rubber to metal bonding processes no longer suffice for the substantially increased requirements of present day practice so that endeavors are made to improve the bonds obtained considerably so that the filler rubber layer and the metal remain firmly bonded together even under continued strong dynamic stresses.

SUMMARY OF THE INVENTION

It is an object of the invention to provide a method for improving the adhesion of vulcanizable, active reenforcing filler containing natural and/or synthetic rubber mixtures to metals so as to obtain bonds which meet the requirements as to bending strength even over long periods of time.

According to the invention this object is achieved by admixing (1) active reenforcing extremely finely divided silicas and/or aluminum silicate and/or calcium silicate or calcium carbonate, if desired, blended with carbon black and (2) components capable of resin formation with the rubber composition before it is vulcanized on the metal. The quantity of the silicas or silicates or calcium carbonate alone or blended with carbon black admixed with the rubber composition is 5 to 100, preferably, 10 to 50 parts by weight per 100 parts by weight of rubber. A further improvement in the bond obtained can be achieved by admixture of heavy metal oxides with the rubber composition prior to the vulcanization.

DETAILED DESCRIPTION OF THE INVENTION INCLUDING PREFERRED EMBODIMENTS

Preferably finely divided silicas are employed as the active reenforcing inorganic fillers used according to the invention. Such silicas can, for example, be those produced by wet precipitation in finely divided amorphous form from water glass with the aid of acids or those produced pyrogenically, such as Aerosil and Cabosil. Such silicas have a BET surface area of about 30 to 400 m.$^2$/g. and an average primary particle size of about 10 to 400 m$\mu$.

Active carbon black can be employed in conjunction with the inorganic active reenforcing fillers in quantities between 0 and 100, preferably, 0 and 50 parts by weight per 100 parts by weight of rubber in the rubber composition.

Phenols, especially resorcinol, and/or amines and aldehydes or aldehyde donors capable of forming resins with the phenols and/or amines, especially, hexamethylene tetramine, are employed as the resin forming components incorporated in the rubber composition. Preferably the quantities of resin forming components employed are 0.5 to 8, preferably, 1 to 4 parts by weight per 100 parts by weight of rubber in the rubber composition.

It was also surprisingly found that the admixture of heavy metal oxides, such as, iron oxide, manganese oxide, nickel oxide, cobalt oxide, copper oxide, cadmium oxide, chromium oxide and especially lead oxide with the rubber composition containing the inorganic filler and resin forming component increases the adhesion of the vulcanized rubber to metal. The quantity of such heavy metal oxide incorporation is between about 0.5 and 5, preferably, between 1 and 3 parts by weight per 100 parts by weight of rubber in the rubber composition.

To illustrate the improved adhesion obtained according to the invention the results of compartive tests employing various rubber mixture combinations are given in Tables 1 and 2. The comparative tests in Table 1 were with natural rubber containing compositions and those in Table 2 were with synthetic rubber. In both tables, tests 1 and 2 were with compositions prepared with active carbon black alone as filler, tests 3 and 4 were carried out with a combination of active carbon black and active silica as filler, tests 5 and 6 were carried out with active carbon black as sole filler in combination with resin forming components and tests 7 and 8 were carried out with the carbon black-silica filler combination in combination with the resin forming components. In addition, tests 2, 4, 6 and 8 were carried out with rubber compositions which also contained lead oxide to show the influence of the presence of heavy metal oxides. The bond strength was tested by embedding steel cords in blocks of the rubber composition having an edge length of 1 cm. and subsequently vulcanizing such block at a pressure of 40' at 145° C. and determining the force required to pull the steel cords from the vulcanized blocks.

combination of components comprising resorcinol and hexamethylenetetramine; and then vulcanizing the thus-modified rubber mixture onto the metal.

2. The process of claim 1 in which said finely divided active reenforcing filler is a finely divided silica having a BET surface area of about 30–400 m.$^2$/g. and an average primary particle size of about 10 to 400 m$\mu$.

3. The process of claim 2 in which the quantity of said resin forming components incorporated in the rubber mixture is between about 0.8 to 8 parts by weight per 100 parts by weight of rubber in the mixture.

4. The process of claim 1 in which a heavy metal oxide selected from the group consisting of lead oxide, iron oxide, nickel oxide, cobalt oxide, manganese oxide, chromium oxide, cadmium oxide and copper oxide is also

TABLE 1

| Recipe/test | 1 | 2 | 3 | 4 | 5 | 6 | 7 | 8 |
|---|---|---|---|---|---|---|---|---|
| Natural rubber | 100 | 100 | 100 | 100 | 100 | 100 | 100 | 100 |
| Stearic acid | 1 | 1 | 1 | 1 | 1 | 1 | 1 | 1 |
| Phenyl-$\beta$-naphthylamine | 1 | 1 | 1 | 1 | 1 | 1 | 1 | 1 |
| High aromatic softener based on naphtha, Naftolen ZD | 4 | 4 | 4 | 4 | 4 | 4 | 4 | 4 |
| Sulfenamide accelerator, Vulkazit DZ (N-phenyl-N-cyclohexyl-p-phenylene-diamine) | 0.7 | 0.7 | 0.7 | 0.7 | 0.7 | 0.7 | 0.7 | 0.7 |
| Sulfur | 5 | 5 | 5 | 5 | 5 | 5 | 5 | 5 |
| Zinc oxide | 8 | 6 | 8 | 6 | 8 | 6 | 8 | 6 |
| Metal oxide, PbO | | 2 | | 2 | | 2 | | 2 |
| Active carbon, Corax 3 | 60 | 60 | 45 | 45 | 60 | 60 | 45 | 45 |
| Active silica, Ultrasil VN 3 | | | 15 | 15 | | | 15 | 15 |
| Resorcinol | | | | | 2.5 | 2.5 | 2.5 | 2.5 |
| Hexamethylene tetramine | | | | | 1.5 | 1.5 | 1.5 | 1.5 |
| Vulcanization 40' at 145° C., bond strength, kg./cm. on: | | | | | | | | |
| Brass plated steel cord | 18 | 17 | 21 | 24 | 21 | 23 | 27 | 31 |
| Uncoated steel cord | 9 | 8 | 10 | 12 | 11 | 12 | 15 | 24 |

NOTE.—Carbon Corax 3 is an HAF (High Abrasion Furnace) black of international standard quality, particle size=29 m$\mu$; Ultrasil VN 3 is a precipitated silica, particle size [1]= 16 m$\mu$, specific surface, BET=240 m.$^2$/g.
[1] Primary.

TABLE 2

| Recipe/test | 1 | 2 | 3 | 4 | 5 | 6 | 7 | 8 |
|---|---|---|---|---|---|---|---|---|
| Styrene butadiene rubber, Buna Hüls 150 | 100 | 100 | 100 | 100 | 100 | 100 | 100 | 100 |
| Stearic acid | 1 | 1 | 1 | 1 | 1 | 1 | 1 | 1 |
| Phenyl-$\beta$-naphthylamine | 1 | 1 | 1 | 1 | 1 | 1 | 1 | 1 |
| High aromatic softener, Naftolen ZD | 4 | 4 | 4 | 4 | 4 | 4 | 4 | 4 |
| Sulfenamide accelerator, Vulkazit CZ | 0.8 | 0.8 | 0.8 | 0.8 | 0.8 | 0.8 | 0.8 | 0.8 |
| Sulfur | 5 | 5 | 5 | 5 | 5 | 5 | 5 | 5 |
| Zinc oxide | 8 | 6 | 8 | 6 | 8 | 6 | 8 | 6 |
| Heavy metal oxide, PbO | | 2 | | 2 | | 2 | | 2 |
| Active carbon black, Corax 3 | 60 | 60 | 45 | 45 | 60 | 60 | 45 | 45 |
| Active silica, Ultrasil VN 3 | | | 15 | 15 | | | 15 | 15 |
| Resorcinol | | | | | 2.5 | 2.5 | 2.5 | 2.5 |
| Hexamethylene tetramine | | | | | 1.5 | 1.5 | 1.5 | 1.5 |
| Vulcanization 40'/145° C., bond strength, kg./cm. on: | | | | | | | | |
| Brass coated steel cord | 15 | 15 | 18 | 20 | 19 | 21 | 24 | 28 |
| Uncoated steel cord | 5 | 5 | 8 | 9 | 9 | 10 | 12 | 15 |

The results of such tests clearly indicate that while the addition of active reenforcing inorganic filler per se already increases the bond strengths or adhesions attained, these are considerably improved when the resin components and heavy metal oxide are used in conjunction therewith. Analogous results are obtained when the silica is replaced with finely divided active reenforcing aluminum silicate, calcium silicate or calcium carbonate.

We claim:
1. The process of forming a composite rubber-metal product wherein a natural or synthetic rubber mixture is firmly bonded to a metal, the said process comprising the steps of intimately mixing with the rubber mixture (a) a finely divided active reinforcing filler selected from the group consisting of silica, aluminum silicate, calcium silicate and calcium carbonate in an amount of 10–100 parts of filler by weight per 100 parts of rubber and (b) a combination of components adapted to form a resin during subsequent vulcanization of the rubber, the said incorporated in the rubber mixture prior to its vulcanization on the metal.

References Cited

UNITED STATES PATENTS

| 3,066,060 | 11/1962 | Gross | 260—846 |
| 3,410,818 | 11/1968 | Yurcick | 260—846 |

FOREIGN PATENTS

| 790,803 | 2/1958 | Great Britain | 260—846 |
| 848,455 | 9/1960 | Great Britain | 260—846 |
| 863,309 | 3/1961 | Great Britain | 260—846 |

MORRIS LIEBMAN, Primary Examiner

S. L. FOX, Assistant Examiner

U.S. Cl. X.R.

260—37 N, 845, 846